(12) United States Patent
Bagnasco et al.

(10) Patent No.: US 8,239,119 B2
(45) Date of Patent: Aug. 7, 2012

(54) METHOD AND SYSTEM FOR ADAPTING SMALL FUEL INJECTION QUANTITIES

(75) Inventors: Andrew P. Bagnasco, Plymouth, MI (US); Allen B. Rayl, Waterford, MI (US); Raymond Claude Turin, Grosse Pointe Park, MI (US)

(73) Assignee: GM Global Technology Operations LLC

( * ) Notice: Subject to any disclaimer, the term of this patent is extended or adjusted under 35 U.S.C. 154(b) by 646 days.

(21) Appl. No.: 12/476,550

(22) Filed: Jun. 2, 2009

(65) Prior Publication Data
US 2010/0305831 A1    Dec. 2, 2010

(51) Int. Cl.
*F02D 41/16* (2006.01)
*G06F 17/00* (2006.01)
(52) U.S. Cl. ........................................... 701/103
(58) Field of Classification Search .......... 701/103–105, 701/102, 115; 123/299, 300, 304
See application file for complete search history.

(56) References Cited

U.S. PATENT DOCUMENTS
6,651,631 B2 * 11/2003 Hayashi et al. ............... 123/520

FOREIGN PATENT DOCUMENTS
JP        403160135 A  *  7/1991
* cited by examiner

*Primary Examiner* — Hieu T Vo

(57) ABSTRACT

A method and system for controlling an engine includes a normal individual cylinder fuel correction determination module determining normal pulse mode individual cylinder fuel corrections in a normal pulse mode. The system also includes a split pulse enable module operating the fuel injectors in split pulse mode having a linear pulse and a ballistic pulse smaller than the linear pulse. The system also includes a split pulse individual cylinder fuel correction determination module determining split pulse mode individual cylinder fuel corrections in the split pulse mode. The system also includes a ballistic pulse adaptation module adjusting ballistic pulse calibration values in response to the normal pulse mode individual cylinder fuel corrections and the split pulse mode individual cylinder fuel corrections to form adjusted ballistic pulse calibration values.

20 Claims, 4 Drawing Sheets

METHOD AND SYSTEM FOR ADAPTING SMALL FUEL INJECTION QUANTITIES

FIELD

The present disclosure relates to engine control systems, and more particularly to adjusting injection quantities of a fuel injector suitable for injecting relatively small quantities.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As fuel economy and emissions requirements become stricter, new combustion technologies are being developed. For example, engines are being developed to not only run in spark ignition mode but also a homogenous charge compression ignition (HCCI) mode. The HCCI mode involves compressing a mixture of fuel and an oxidizer to a point of auto-ignition. One of the modes may be selected based on engine speed and load. Another advanced technology is the use of lean stratified operation. Both of these technologies require relatively small fuel injection quantities in the ballistic range of less than 5 milligrams of injected fuel. The injector ballistic range is defined as the range of injected quantities for which the pintal does not contact the opening stop. Conventional fuel injection systems have a large variation of injected fuel quantity when used for metering small quantities.

SUMMARY

The system according to the present disclosure operates the fuel injectors using both a normal or linear pulse and a small or ballistic pulse. Individual fuel control is then used to update the individual injector small pulse calibration to allow for the small pulse to be used with the newer combustion technologies.

In one aspect of the disclosure, a method includes determining normal pulse mode individual cylinder fuel corrections in a normal pulse mode, hereafter, operating the fuel injectors in split pulse mode having a linear pulse and a ballistic pulse smaller than the linear pulse, storing split pulse mode individual cylinder fuel corrections in the split pulse mode and adjusting ballistic pulse calibration values in response to the normal pulse mode individual cylinder fuel corrections and the split pulse mode individual cylinder fuel corrections to form adjusted ballistic pulse calibration values.

In another aspect of the disclosure, a system for controlling an engine includes a normal individual cylinder fuel correction determination module determining normal pulse mode individual cylinder fuel corrections for a normal pulse mode. The system also includes a split pulse enable module operating the fuel injectors in split pulse mode having a linear pulse and a ballistic pulse smaller than the linear pulse. The system also includes a split pulse individual cylinder fuel correction determination module determining split pulse mode individual cylinder fuel corrections in the split pulse mode. The system also includes a ballistic pulse adaptation module adjusting ballistic pulse calibration values in response to the normal pulse mode individual cylinder fuel corrections and the split pulse mode individual cylinder fuel corrections to form adjusted ballistic pulse calibration values.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

Figure 1:
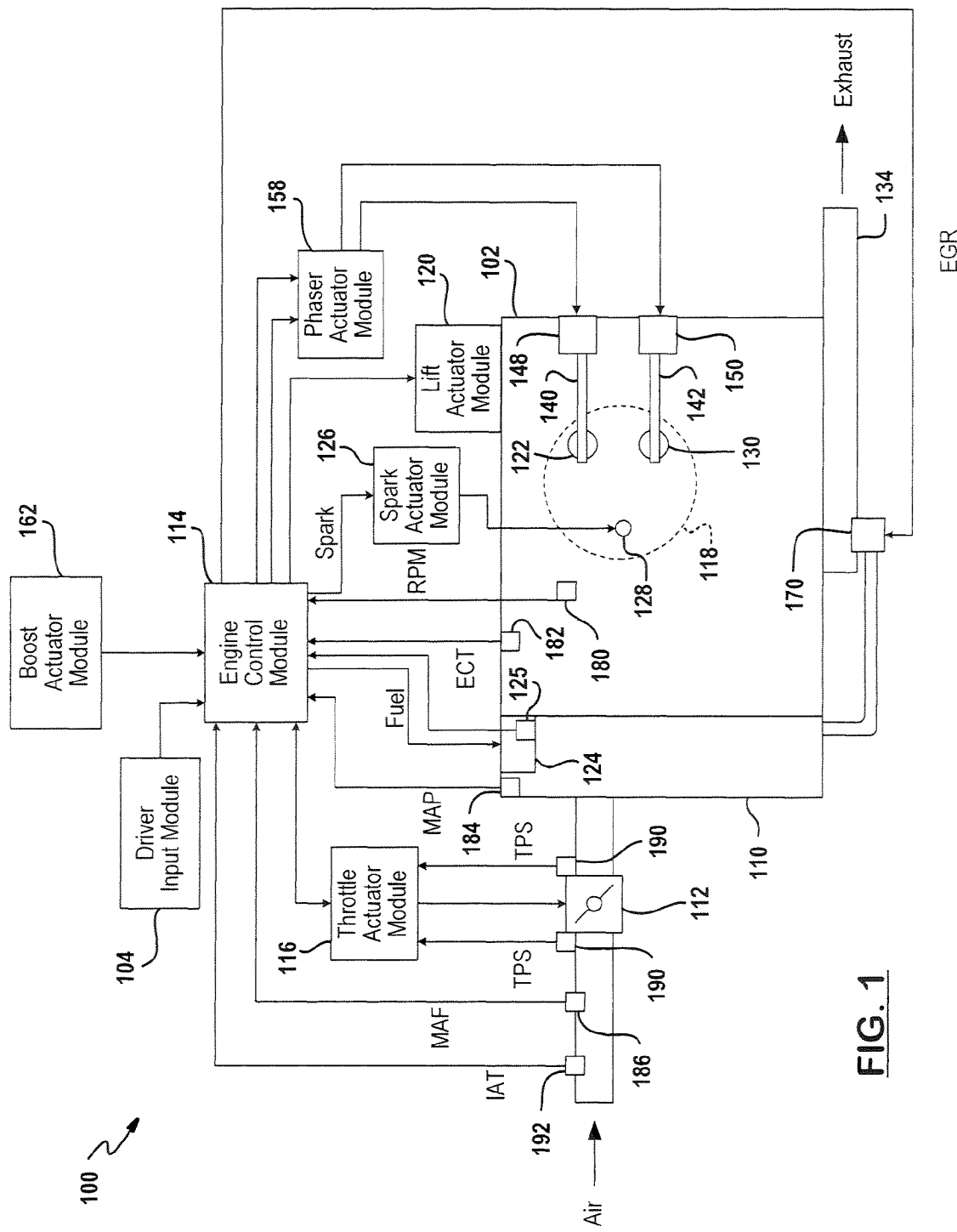
FIG. 1 is a functional block diagram of an engine control system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific integrated Circuit (ASIC), an electronic circuit, a processor (shared, dedicated, or group) and memory that execute one or more software or firmware programs, a combinational logic circuit, and/or other suitable components that provide the described functionality.

The engine control system according to the present disclosure operates may operate the gasoline engine in an SI mode, an HCCI mode or a lean stratified mode. The HCCI mode reduces fuel consumption but is only available over a limited range of engine torques and speeds. For example only, the engine control system may operate the engine in the HCCI mode at low to mid loads and low to mid engine speeds. The engine control system may operate the engine in the SI mode at other loads and engine speeds. The HCCI operating zones may be defined by operating maps in calibration tables.

The engine may be a direct injection gasoline engine and may be selectively operated in the stratified operating mode during the transitions. To operate in the stratified operating mode, the fuel injectors inject the fuel into an area of the cylinder, often a small "sub-cylinder" at the top, or periphery, of the main cylinder. This approach provides a rich charge in that area that ignites easily and burns quickly and smoothly. The combustion process proceeds to a very lean area (often only air) where the flame-front cools rapidly and nitrogen oxides ($NO_x$) have little opportunity to form. The additional oxygen in the lean charge also combines with carbon monoxide (CO) to form carbon dioxide ($CO_2$).

Referring now to FIG. 1, a functional block diagram of an exemplary engine system 100 is presented. The engine system 100 includes an engine 102 that combusts an air/fuel mixture to produce drive torque for a vehicle based on a driver input module 104. The engine may be a direct ignition engine. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders. The fuel injection system 124 may include a fuel injector 125. The fuel injector operates using a pulse. Typical fuel injectors operate in a normal mode with a pulse from the engine control module 114 that opens the fuel injector to inject an amount of fuel that is directly related to the time of the pulse. In the present disclosure, the pulse from the engine control module 114 is divided into a ballistic region that corresponds to a small pulse and a linear region that is greater than the ballistic region. Both the amount of fuel and the time associated with the pulse in the linear region are greater than the amount of fuel and the time associated with the opening of the fuel injector corresponding to the ballistic pulse. By way of example, a ballistic pulse may inject about one to about three milligrams of fuel. A linear pulse may include quantities greater than about 6 mg. The normal pulse may thus be several times greater than the small pulse.

As illustrated, one fuel injector 125 is provided. However, those skilled in the art will recognize that multiple fuel injectors corresponding to the amount of cylinders in the engine may be provided. As mentioned above, the linear region is typically very accurate and thus has a low standard deviation. The ballistic region typically has a high standard deviation. As will be described below, the error associated with ballistic region is significantly reduced using the teachings provided in the present disclosure. By controlling the small or ballistic pulse region, misfires may be prevented in various combustion technologies.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. The lift actuator module 120 adjust the amount of valve lift hydraulically or using other methods.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The ECM 114 may calculate measured air per cylinder (APC) based on the MAF signal generated by the MAF sensor 186. The ECM 114 may estimate desired APC based on engine operating conditions, operator input or other parameters. The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 cane be referred to as an actuator, while the corresponding actuator position is amount of spark advance or retard. Other actuators include the EGR valve 170, the phaser actuator module 158, and the fuel injection system 124. The term actuator position with respect to these actuators may correspond to, EGR valve opening, intake and exhaust cam phaser angles, air/fuel ratio, respectively.

Figure 2:
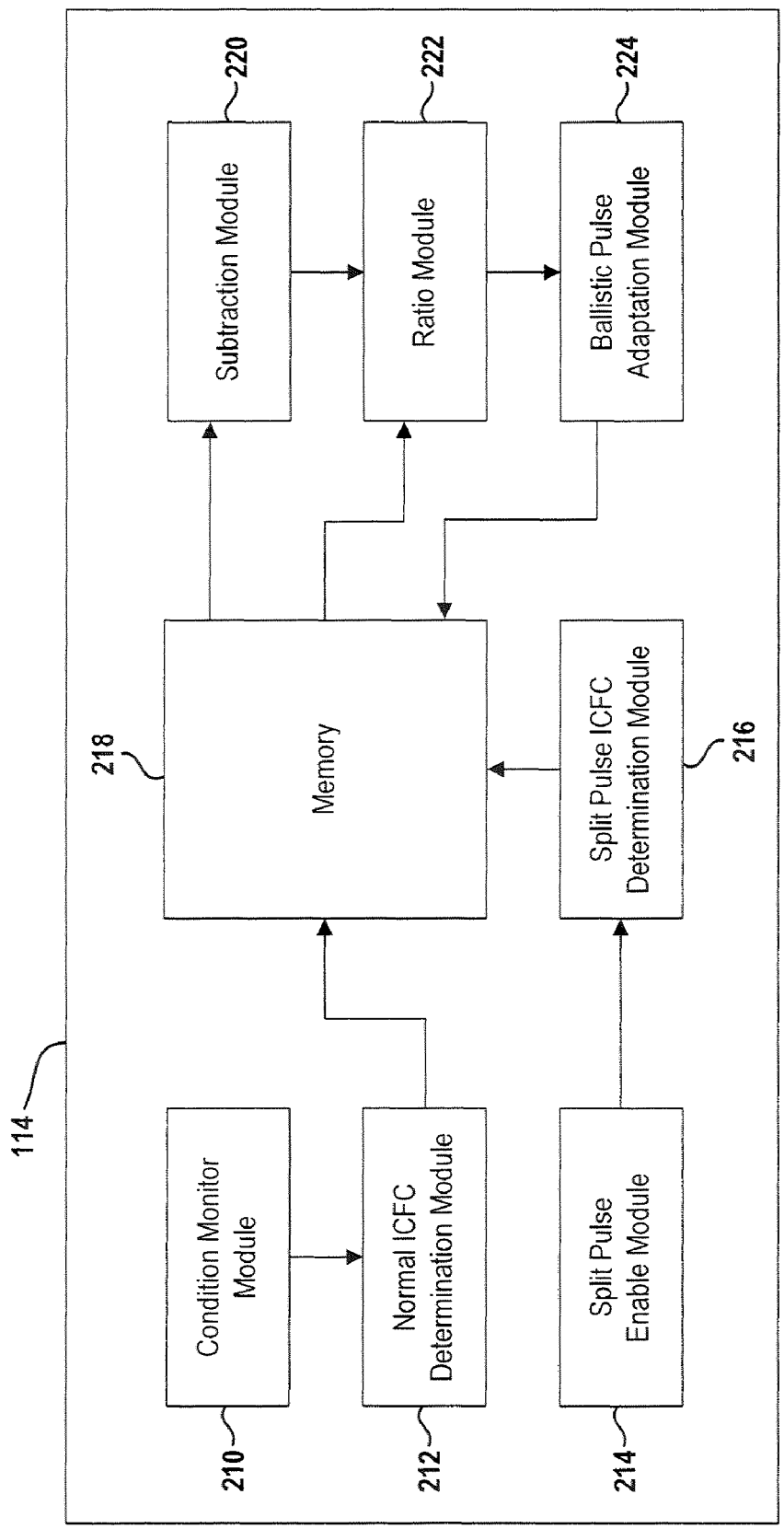
FIG. 2 is a block diagrammatic view of the engine control module of FIG. 1.

Referring now to FIG. 2, a functional block diagram of the engine control module 114 is set forth in further detail. The engine control module 114 includes a condition monitor module 210. The condition monitor module 210 monitors the entry conditions for reducing ballistic range fuel metering error. Entry conditions may include setting the combustion mode to conventional spark ignited mode and performing the method at a light load or at an idle speed.

The condition monitor module 210 may be in communication with a normal individual cylinder fuel correction (ICFC) determination module 212. The normal individual cylinder fuel correction may correspond to conventional fuel injector operating using a single normal-size fuel pulse to inject the entire desired quantity of fuel it should be noted that the individual cylinder fuel corrections are determined for each of the cylinders and thus for each of the fuel injectors of the engine.

The engine after the normal operating mode may operate in a split injection pulse mode. A split pulse enable module 214 operates the fuel injector in a split injection pulse mode. The split injection pulse mode may have a ballistic range that corresponds to a small pulse such as 1-3 milligrams of fuel and a normal pulse range that corresponds to the total amount of fuel required minus the small pulse. A normal pulse may be about 10 milligrams.

The individual cylinder fuel corrections are determined for each of the cylinders in the split pulse ICFC determination module 216. It should be noted that the individual fuel corrections determined using the normal pulse operation and the split pulse operation may be stored in a memory 218.

A subtraction module 220 may subtract the normal individual cylinder fuel corrections from the split pulse individual cylinder fuel corrections. In block 222, a ratio module may determine the ratio of the normal pulse to the split pulse. The ratio module may then multiply the difference of the normal pulse and the split pulse individual cylinder fuel corrections. In block 224, the ballistic pulse adaptation module adapts the ballistic pulse calibration based upon the weighted difference determined in block 222.

Figure 3:
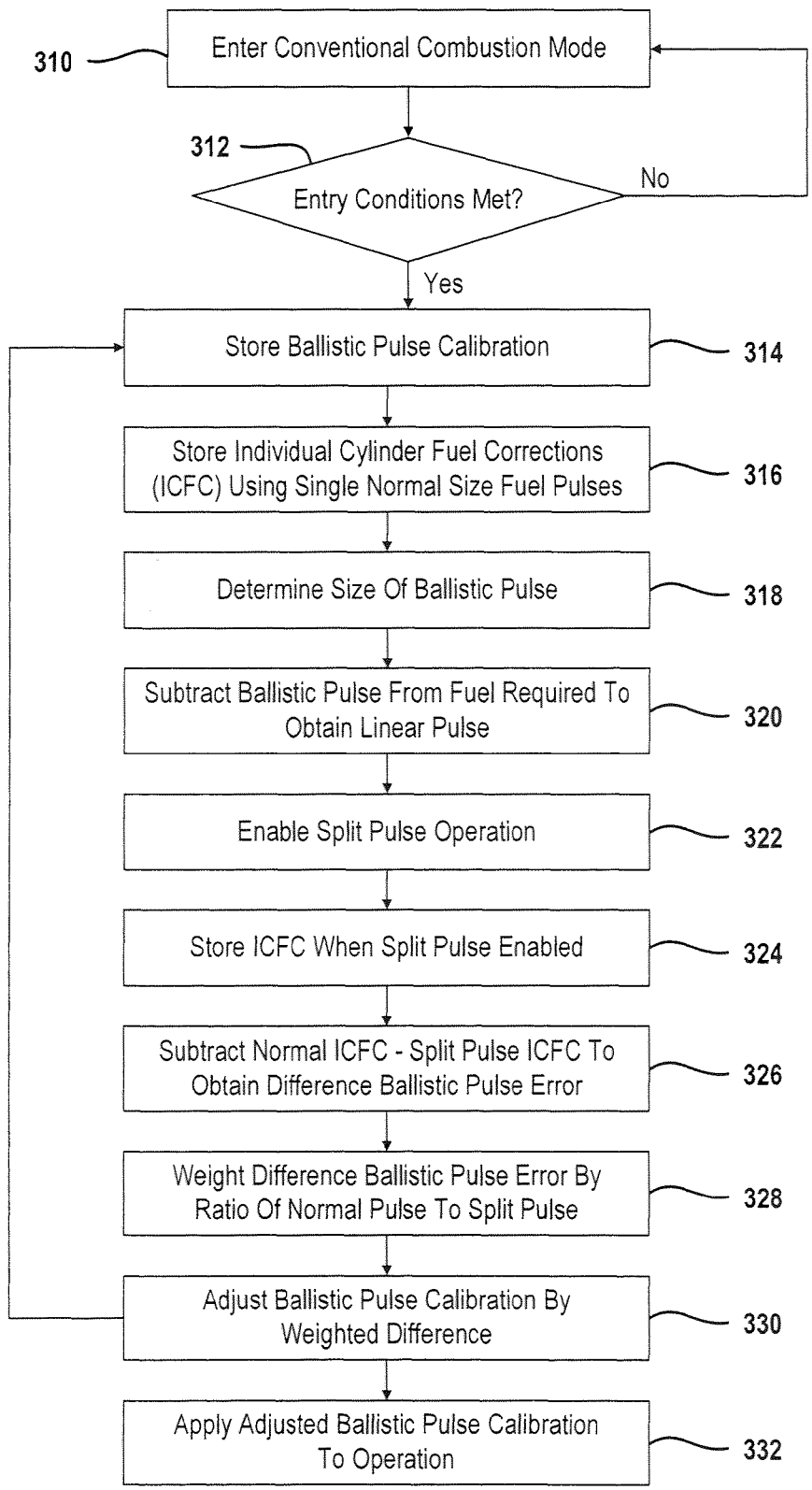
FIG. 3 is a flowchart of a method for operating the disclosure.

Referring now to FIG. 3, a method for adjusting the ballistic range fuel metering area is set forth. In step 310, a conventional combustion mode is entered if the engine is not operating in a conventional combustion mode. In step 312, a determination of the entry conditions for the method is performed.

If the entry conditions are not met in step 312, step 310 is again performed. When the entry conditions are met in step 312, step 314 stores a ballistic pulse calibration. The ballistic pulse calibration may be updated periodically as will be further described below. An initial calibration may be provided and stored during the manufacture of the vehicle. In step 316, the individual cylinder fuel corrections (ICFC) using the normal single fuel pulses may be stored in the memory.

In step 318, the injection pulse is split into a ballistic pulse and a normal or linear pulse. The size of the ballistic pulse, as mentioned above, may vary from about one to about three milligrams of fuel. In step 320, the ballistic pulse is subtracted from the total fuel required to obtain the linear pulse. The pulse may correspond to a time size of the pulse or to a weight of the injected fuel.

In step 322, a split pulse operation of the vehicle is enabled. The split pulse operation operates with the linear pulse and the ballistic pulse. In step 324, the individual cylinder fuel corrections are stored in the memory when the split pulse is enabled.

In step 326, the normal individual cylinder fuel corrections are subtracted from the split pulse individual fuel corrections to obtain a difference. The difference may be referred to as a ballistic pulse error. In step 328, the difference from step 326 is weighted. The weighting may be of the ratio of the normal pulse to the split pulse. In step 330, the ballistic pulse calibration of step 314 is adjusted using the weighted difference. Repeating the process periodically provides continual updates. In step 332, the adjusted ballistic pulse calibration is used in the operation of the fuel injectors and thus the operation of the engine. The operation of the engine may use the adjusted ballistic pulse calibration in a lean stratified mode or in an HCCI mode. The adjusted ballistic pulse calibration may be stored and continually adjusted using the abovementioned process. By continually adjusting the ballistic pulse calibration, the risk of misfire due to fueling errors is reduced due to the adaptive learning techniques, and overall combustion robustness and efficiency is improved.

Figure 4:
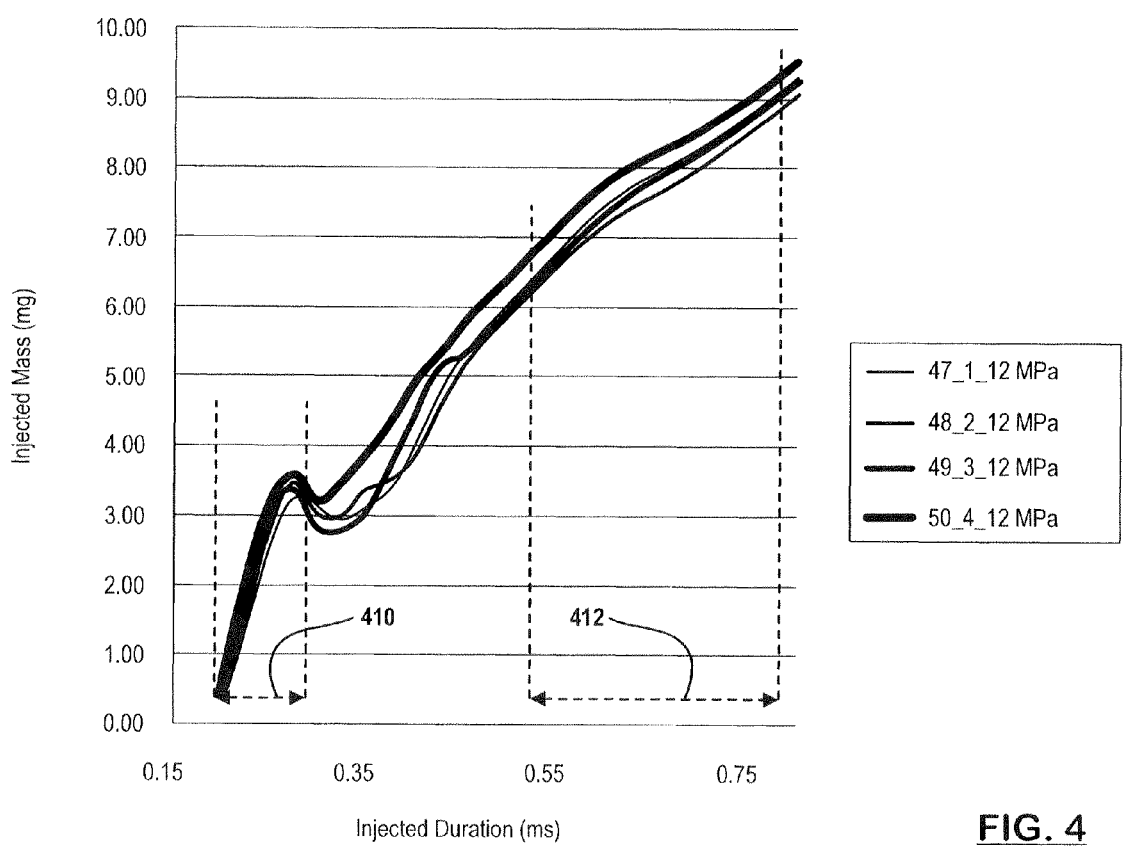
FIG. 4 is a plot of injected mass versus injector pulse duration.

Referring now to FIG. 4, a plot of injected mass versus injection duration is illustrated. Low-injection durations between about 0.2 and about 0.3 correspond to a ballistic region 410. As mentioned above, the ballistic region has high injector to injector variability of fuel mass metering.

A linear or normal region 412 is illustrated above approximately 0.55 milliseconds. That is, pulses in this region exhibit a linear flow rate distribution with acceptable injector-to-injector variability.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A system for controlling an engine comprising:
a normal individual cylinder fuel correction determination module determining normal pulse mode individual cylinder fuel corrections in a normal pulse mode;
a split pulse enable module operating fuel injectors in split pulse mode having a linear pulse and a ballistic pulse smaller than the linear pulse;
a split pulse individual cylinder fuel correction determination module determining split pulse mode individual cylinder fuel corrections in the split pulse mode; and
a ballistic pulse adaptation module adjusting ballistic pulse calibration values in response to the normal pulse mode individual cylinder fuel corrections and the split pulse mode individual cylinder fuel corrections to form adjusted ballistic pulse calibration values.

2. A system as recited in claim 1 further comprising a subtraction module generating a difference of the normal pulse mode individual cylinder fuel corrections and the split pulse mode individual cylinder fuel corrections, wherein the ballistic pulse adaptation module adjusts ballistic pulse calibration values in response to the difference.

3. A system as recited in claim 2 further comprising a ratio module determining a ratio of a normal pulse and a split pulse and wherein the ballistic pulse adaptation module adjusts ballistic pulse calibration values in response to the difference and the ratio.

4. A system as recited in claim 1 further comprising a condition monitor module determining entry conditions.

5. A system as recited in claim 4 wherein the entry conditions comprise a load condition.

6. A system as recited in claim 4 wherein the entry conditions comprise a fuel per cylinder condition.

7. A system as recited in claim 4 wherein the entry conditions comprise a spark ignition mode.

8. A system as recited in claim 4 wherein an engine control module operates the engine in a homogeneous charge compression ignition mode in response to the adjusted ballistic pulse calibration values.

9. A system as recited in claim 4 wherein an engine control module operates the engine in a stratified lean mode in response to the adjusted ballistic pulse calibration values.

10. A method of controlling fuel injectors of an engine comprising:
determining normal pulse mode individual cylinder fuel corrections in a normal pulse mode;
thereafter, operating the fuel injectors in split pulse mode having a linear pulse and a ballistic pulse smaller than the linear pulse;

storing split pulse mode individual cylinder fuel corrections in the split pulse mode; and adjusting ballistic pulse calibration values in response to the normal pulse mode individual cylinder fuel corrections and the split pulse mode individual cylinder fuel corrections to form adjusted ballistic pulse calibration values.

11. A method as recited in claim 10 wherein adjusting ballistic pulse calibration values comprises adjusting ballistic pulse calibration values in response to a difference of the normal pulse mode individual cylinder fuel corrections and the split pulse mode individual cylinder fuel corrections.

12. A method as recited in claim 10 wherein adjusting ballistic pulse calibration values comprises adjusting ballistic pulse calibration values in response to a weighted difference of the normal pulse mode individual cylinder fuel corrections and the split pulse mode individual cylinder fuel corrections.

13. A method as recited in claim 10 wherein adjusting ballistic pulse calibration values comprises adjusting ballistic pulse calibration values in response to a difference of the normal pulse mode individual cylinder fuel corrections and the split pulse mode individual cylinder fuel corrections weighted by a ratio of a normal pulse and a split pulse.

14. A method as recited in claim 10 further comprising prior to determining normal pulse mode individual cylinder fuel corrections, determining entry conditions.

15. A method as recited in claim 14 wherein determining entry conditions comprises determining a load condition.

16. A method as recited in claim 14 wherein determining entry conditions comprises determining a spark ignition mode.

17. A method as recited in claim 10 further comprising operating the engine in response to the adjusted ballistic pulse calibration values.

18. A method as recited in claim 10 further comprising operating the engine in a homogeneous charge compression ignition mode in response to the adjusted ballistic pulse calibration values.

19. A method as recited in claim 10 further comprising operating the engine in a stratified lean mode in response to the adjusted ballistic pulse calibration values.

20. A method as recited in claim 10 wherein operating the fuel injectors in split pulse mode having a linear pulse and a ballistic pulse smaller than the linear pulse comprises operating the fuel injectors in split pulse mode having a linear pulse less than about 8 milligrams of fuel and a ballistic pulse less than about 3 milligrams of fuel.

* * * * *